March 2, 1971  H. BURBIG  3,566,424
COMBINATION SPATULA
Filed Jan. 13, 1969
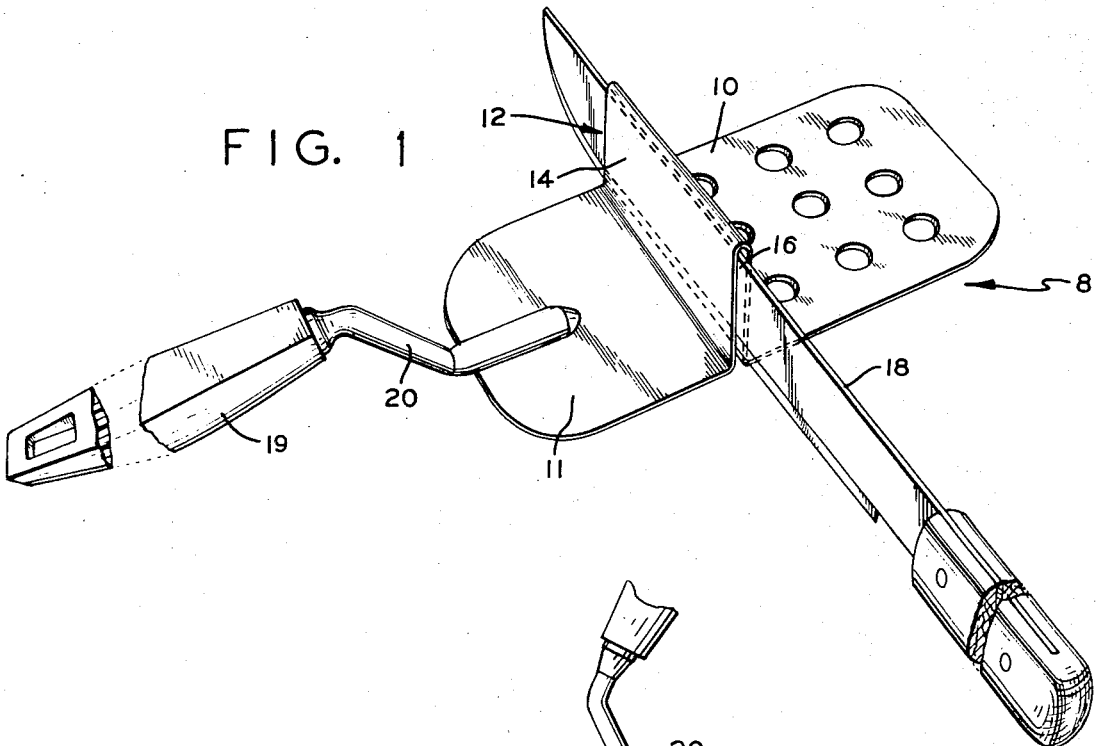
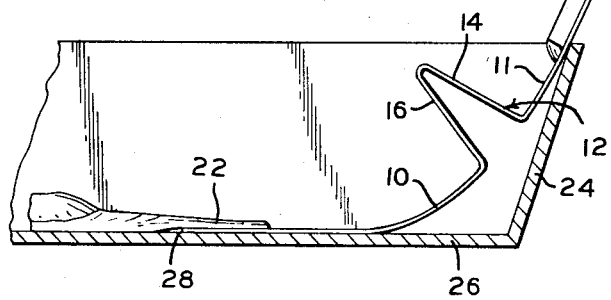
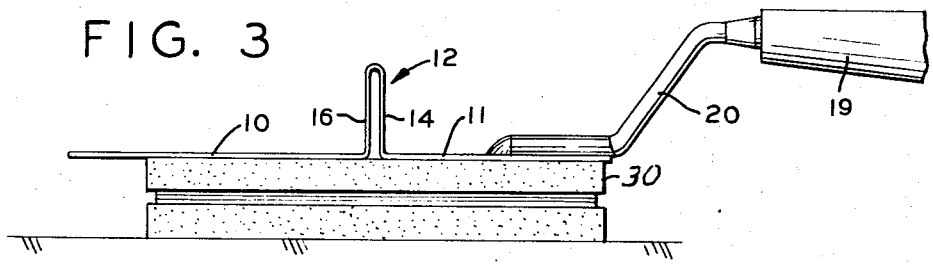
INVENTOR.
HENRY BURBIG
BY
JOHN P. CHANDLER
HIS ATTORNEY.

United States Patent Office 3,566,424
Patented Mar. 2, 1971

3,566,424
COMBINATION SPATULA
Henry Burbig, 1519 Metropolitan Ave.,
New York, N.Y. 10462
Filed Jan. 13, 1969, Ser. No. 790,651
Int. Cl. A47j *43/28;* B25f *1/00;* B27g *17/04*
U.S. Cl. 7—1                                                3 Claims

ABSTRACT OF THE DISCLOSURE

A combined spatula or pancake turner, and holddown device with a channel for guiding a cutting knife. The spatula has a blade formed from a single piece of flat spring sheet metal with front and rear sections lying on about the same plane and is formed with an inverted U-shaped channel between the sections which extends upwardly from said plane. The channel forms a slideway to receive a knife for cutting flat articles of food which are firmly held against a support while being cut with the knife. The upper end of the channel also forms a bending area to permit the second section to be bent upwardly while the first section is held flat against a pan to remove articles from the pan lying near the edge thereof.

---

This invention relates to a combination culinary utensil provided with a generally flat blade and a handle, and which can be used for turning pancakes or eggs, serving cake, etc. and wherein the blade has a transverse bending area between its ends which permits the forward section of the flat blade to dip down into the area of a frying pan immediately adjacent the rim and remove articles of food which have been cooked thereon.

Efforts have been made to solve the problem of inducing the flat blade of a pancake turner to enter the pan area adjacent the rim, by forming the blade from thinner than usual sheet metal of extreme flexibility but the overall result is to lose the strength which a blade of this kind should have in order to be effective.

The present spatula has a blade of approved thickness of springy sheet metal or other material and which has a forward and a rear section joined together by an inverted U-shaped section extending upwardly from the general plane of the sections. This upwardly extending U-shaped section forms a channel which can receive a sharp knife. The blade now forms a hold-down plate for a flat article of food like a sandwich which is to be cut into a plurality of parts. By thus holding down the sandwich, the knife, located in this closed channel with its open ends, is moved forward and backwards to cut the sandwich. Not only is this more sanitary than using the person's fingers as the hold down means, but it also greatly reduces the danger of cutting one's fingers.

The inverted U-shaped channel thus has two purposes, one to facilitate the bending action and the other to serve as a closed guideway or channel for the knife.

In the drawings:

FIG. 1 is a perspective view of the spatula of the present invention showing its uses as a food hold-down device;

FIG. 2 shows the use of the spatula for removing food from areas close to the edge of a frying pan; and FIG. 3 shows the use of the spatula for holding down a sandwich while cutting.

The culinary utensil shown in FIG. 1 has a blade 8 formed with front and rear, generally rectangular sections 10 and 11 formed in a single piece, lying generally in a single plane, and joined by an upwardly-extending inverted U-shaped channel 12 whose opposed walls 14 and 16 are spaced apart a distance sufficient to receive the blade 18 of a slicing knife. The blade 8 has a handle 19 connected therewith by an angle bracket 20.

The blade is made from springy flexible steel or other suitable material and the forward section is long enough to serve the usual purpose of the conventional pancake turner. FIG. 2 illustrates the usefulness of the utensil in removing an article 22 lying near the rim 24 of a frying pan 26. The forward section 10 lies substantially flat in the pan while the rear section 11 commences to curve upwardly as a result of its inherent resiliency and also because of the unique formation of the channel which forms a bending area at its upper end. The structure and function is such that the forward edge 28 can be inserted downwardly close to the rim and the front section 10 moves right under the cake or other article and as the forward edges advances, the sections to the rear follow the contour of the rim right on down until the entire blade has moved away from the rim.

The second use for the improved utensil is shown in FIG. 3. A sandwich shown at 30 is placed on a cutting board and the blade of the utensil placed thereon with the channel 12 located in the area where the sandwich is to be cut. The knife 18 is guided in the channel during its cutting action and the sandwich is firmly held down without the hands touching it.

What is claimed is:

1. A multi-purpose culinary utensil and including an elongated blade formed from a single piece of flat spring sheet metal with front and rear sections lying on about the same plane and formed with an inverted U-shaped channel between the sections which extends upwardly from said plane, and a handle extending longitudinally from said second section, the walls forming the channel being parallel and spaced apart a distance sufficient to form a slideway to receive a knife for cutting flat articles of food which are firmly held against a support while being cut with the knife, the upper end of the channel forming a bending area to permit the second section to be bent upwardly while the first section is held flat against a pan to remove articles from the pan lying near the edge thereof.

2. The utensil defined in claim 1, wherein the length of the front blade section is great enough to serve as a turning device for pancakes and the like.

3. The utensil defined in claim 1, wherein the length of the rear blade section is less than that of the front blade section.

References Cited

UNITED STATES PATENTS

| | | | |
|---|---|---|---|
| 2,478,572 | 8/1949 | Di Addario | 30—289 |
| 2,489,606 | 11/1949 | Allen | 30—169UX |
| 2,925,110 | 2/1960 | Bayers | 30—289UX |

THERON E. CONDON, Primary Examiner

R. V. PARKER, JR., Assistant Examiner

U.S. Cl. X.R.

15—236; 30—169; 146—50; 294—7